(12) United States Patent
Ji et al.

(10) Patent No.: US 11,657,792 B2
(45) Date of Patent: May 23, 2023

(54) VARIABLE WHEEL RESONATOR SYSTEM FOR A VEHICLE

(71) Applicants: HYUNDAI MOTOR COMPANY, Seoul (KR); KIA MOTORS CORPORATION, Seoul (KR)

(72) Inventors: Sang Woo Ji, Yongin-si (KR); Hui Won Shin, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 498 days.

(21) Appl. No.: 16/848,448

(22) Filed: Apr. 14, 2020

(65) Prior Publication Data

US 2021/0065672 A1 Mar. 4, 2021

(30) Foreign Application Priority Data

Aug. 30, 2019 (KR) ........................ 10-2019-0107015

(51) Int. Cl.
*G10K 11/172* (2006.01)
*B60C 19/00* (2006.01)
*B60B 21/12* (2006.01)

(52) U.S. Cl.
CPC ............ *G10K 11/172* (2013.01); *B60B 21/12* (2013.01); *B60B 2900/133* (2013.01)

(58) Field of Classification Search
CPC ................. G10K 11/172; G10K 11/16; G10K 2210/32272; G10K 2210/3227; B60B 21/12; B60B 21/02; B60B 21/026; B60B 21/023; B60B 2900/133; B60B 19/00; B60C 19/002; B60C 19/00

See application file for complete search history.

(56) References Cited

U.S. PATENT DOCUMENTS

| | | | | | |
|---|---|---|---|---|---|
| 5,325,902 | A | * | 7/1994 | Loewe | B60C 23/004 152/418 |
| 5,598,479 | A | * | 1/1997 | Dodt | G10K 11/172 381/71.7 |
| 7,690,478 | B2 | * | 4/2010 | Kostun | F02M 35/1255 181/241 |

(Continued)

FOREIGN PATENT DOCUMENTS

| CN | 215321766 U | * 12/2021 |
|---|---|---|
| CN | 215751709 U | * 2/2022 |

(Continued)

*Primary Examiner* — Edgardo San Martin
(74) *Attorney, Agent, or Firm* — Lempia Summerfield Katz LLC

(57) ABSTRACT

A variable wheel resonator system for a vehicle can suppress a resonance noise in a wide resonance frequency band occurring during driving of the vehicle by variably controlling an amount of air flowing from a first air chamber of a tire to a second air chamber and then flowing again to the first air chamber through an on/off control of a solenoid valve mounted on a wheel resonator. The system can suppress the resonance noise in the resonance frequency band that differs in accordance with a road-surface input frequency change (road-surface impact change) input to the tire, a driving speed and turning condition change, and a temperature change of an internal air of the tire.

9 Claims, 4 Drawing Sheets

(56) References Cited

U.S. PATENT DOCUMENTS

| | | | |
|---|---|---|---|
| 8,181,685 B2 * | 5/2012 | Kamiyama | ............... B60B 1/08 |
| | | | 301/6.91 |
| 9,584,190 B2 * | 2/2017 | Ji | ......................... H04B 5/0037 |
| 2010/0096909 A1 | 4/2010 | Kamiyama | |
| 2022/0189447 A1 * | 6/2022 | Furumori | ................ B60B 21/12 |

FOREIGN PATENT DOCUMENTS

| | | | | |
|---|---|---|---|---|
| DE | 102018221623 A1 | * | 6/2020 | |
| EP | 1381025 A2 | * | 1/2004 | ........... G10K 11/161 |
| EP | 2783879 A1 | * | 10/2014 | .............. B60B 21/12 |
| EP | 3663109 A1 | * | 6/2020 | ......... B60B 17/0024 |
| JP | H08109833 A | * | 4/1996 | ........... G10K 11/172 |
| JP | 2002079802 A | * | 3/2002 | |
| JP | 2002234305 A | * | 8/2002 | |
| JP | 2006335226 A | * | 12/2006 | |
| JP | 2010173516 A | * | 8/2010 | |
| KR | 102097003 B1 | * | 4/2020 | ........... B60C 19/002 |
| WO | WO-2010049134 A1 | * | 5/2010 | ........... B60C 23/041 |
| WO | WO-2019132519 A1 | * | 7/2019 | ............. B60B 21/12 |

\* cited by examiner

FIG. 1 - Prior Art
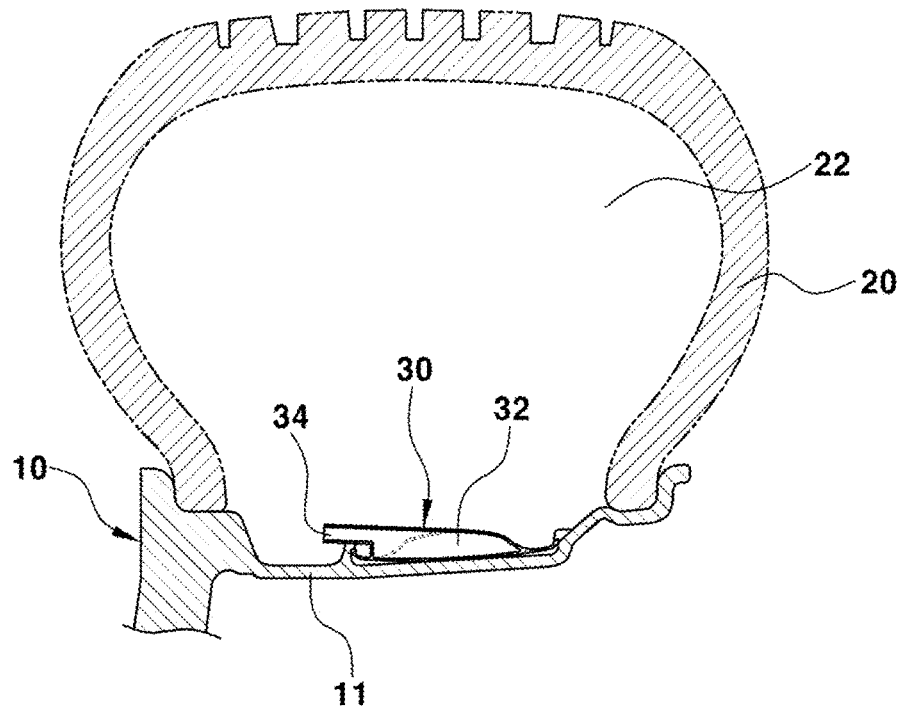
FIG. 2 - Prior Art
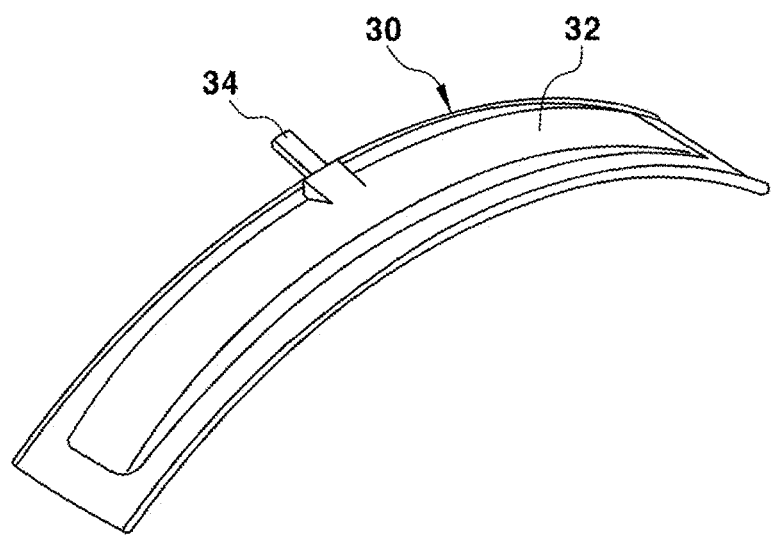

⇨ : Air flow

⇨ : Air flow

VARIABLE WHEEL RESONATOR SYSTEM FOR A VEHICLE

CROSS-REFERENCE TO RELATED APPLICATION

This application claims under 35 U.S.C. § 119(a) the benefit of priority to Korean Patent Application No. 10-2019-0107015 filed on Aug. 30, 2019, the entire contents of which are incorporated herein by reference.

BACKGROUND

(a) Technical Field

The present disclosure relates to a variable wheel resonator system for a vehicle, and more particularly, to a variable wheel resonator system for a vehicle capable of reducing resonance noise within a wide frequency band through variable control of air flow in a tire in accordance with a change in a road-surface input frequency.

(b) Background Art

In general, a phenomenon, referred to as "resonance", is where a vibration system periodically receives an external force having the same frequency as its natural frequency to clearly increase the amplitude thereof.

Resonance is the phenomenon that occurs in all vibrations, such as mechanical vibration and electrical vibration.

Because a tire mounted on a rim portion of a vehicle wheel continuously rubs against a road surface during vehicle driving, a vibration occurs on a side wall of the tire due to tire excitation caused by the road surface. Such a vibration of the side wall causes a resonance phenomenon to occur in an internal space of the tire.

The resonance phenomenon occurring in the internal space of the tire causes the occurrence of a resonance noise having a sharp peak of about a 200 Hz frequency band. Such a resonance noise is transferred to an inside of the vehicle to degrade the ride comfort of the passengers.

As a method for reducing such a resonance noise, a method for mounting a resonator on a rim portion of a wheel has been applied.

FIGS. 1 and 2 illustrate a wheel resonator in the related art.

As illustrated in FIG. 1, a tire 20 is mounted on a rim portion 11 of a vehicle wheel 10. An internal space of the tire 20 forms a first airtight air chamber 22.

A resonator 30 has a second air chamber 32 of a specific volume formed therein. The resonator 30 is mounted on an outer diameter portion of the rim portion 11.

On one side portion of the resonator 30, an air vent 34 is formed through which the first air chamber 22 and the second air chamber 32 communicate with each other.

A specific frequency generated by the vibration of the tire during driving of the vehicle flows into the second air chamber 32 through the air vent 34 formed on the resonator 30. Then, by the air in the second air chamber 32 acting like a spring, the vibration is converted into a new vibration with a reverse phase. At the same time, this reverse phase vibration flows into the second air chamber 22, i.e., the internal space of the tire 20 through the air vent 34, which, by phase shift, causes the specific frequency within the tire to become extinct or nullified, thus reducing the resonance noise within the tire.

However, the wheel resonator in the related art achieves the vibration suppression and noise suppression functions only with respect to the fixed specific frequency region (e.g., 200 Hz). Thus, there has been a need for the noise suppression capability with respect to a wider frequency region.

The above information disclosed in this background section is only to enhance understanding of the background of the disclosure and therefore it may contain information that does not form the prior art that is already known in this country to a person of ordinary skill in the art.

SUMMARY OF THE DISCLOSURE

The present disclosure is proposed for solving the above problems. The object of the present disclosure is to provide a variable wheel resonator system for a vehicle capable of reducing resonance noise in a wide resonance frequency band through variable control of air flow that passes through a resonator within a tire in accordance with a change in a road-surface input frequency using a wireless power and a solenoid valve.

In one aspect of the present disclosure for achieving the object, a variable wheel resonator system for a vehicle includes a resonator structured to have a second air chamber formed therein and an air vent formed on one side portion thereof for communication with a first air chamber within a tire. The resonator is mounted on a rim portion of a wheel. The system also includes a solenoid valve mounted on a specific position of the resonator and configured to adjust an amount of air flowing from the first air chamber to the second air chamber. The system also includes a power supply configured to provide power for a turn-on operation of the solenoid valve. The system also includes a controller configured to control current being applied from external power via an external power source to the power supply to suit a power supply time for turning on/off the solenoid valve and a periodic signal.

In one example, the power supply is adopted as a wireless power transmission and reception system.

The wireless power transmission and reception system may include a transmission-side coil mounted on a wheel guard and configured to be supplied with power from the external power and to supply wireless power. The wireless power transmission and reception system may also include a reception-side coil mounted on a surface of the resonator and configured to receive the wireless power from the transmission-side coil and to supply the received wireless power to the solenoid valve.

One controller is composed of one module on the transmission-side coil to apply the current to the transmission-side coil to suit the power supply time for turning on/off the solenoid valve and the periodic signal.

The controller repeats the on/off operation of the solenoid valve by applying the current to the transmission-side coil to suit the power supply time for turning on/off the solenoid valve and the periodic signal based on the vehicle information.

The solenoid valve includes a built-in power circuit conductively connected to the reception-side coil and configured to convert an alternating current (AC) into a direct current (DC).

During the turn-on operation of the solenoid valve, the air in the first air chamber of the tire enters into the second air chamber of the resonator through the solenoid valve. The air then flows into the first air chamber through the air vent of the resonator.

In accordance with a repetition period of the on/off operation of the solenoid valve, an amount of air flow is controlled entering from the first air chamber into the second air chamber through the solenoid valve and then flowing into the first air chamber through the air vent.

The solenoid valve is mounted on both-side symmetric positions of the air vent of the resonator.

Through the above-described problem-solving means, the present disclosure provides a number of effects.

Through the on/off control of the solenoid valve mounted on the wheel resonator, it is possible to suppress the resonance noise in wide resonance frequency band occurring during the vehicle driving by variably controlling the amount of the air flowing from the first air chamber of the tire to the second air chamber and then flowing again to the first air chamber.

In other words, it becomes possible to suppress the resonance noise of the resonance frequency band that differs in accordance with the road-surface input frequency change (road-surface impact change) input to the tire, the driving speed and turning condition change, and the temperature change of the internal air of the tire.

Other aspects and embodiments of the disclosure are discussed infra.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein:

FIGS. 1 and 2 are diagrams illustrating a wheel resonator in the related art;

Figure 3:
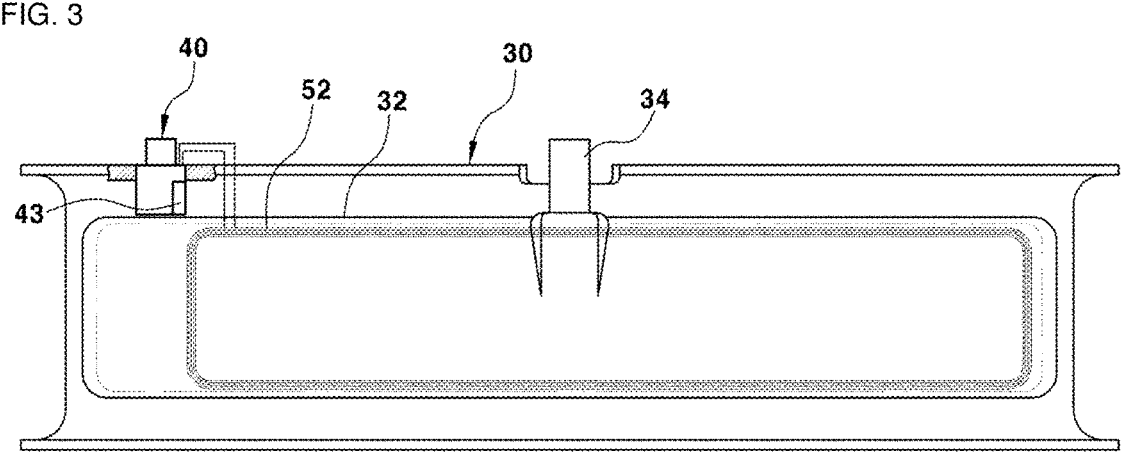
FIG. 3 is a plan view illustrating a resonator of a variable wheel resonator system for a vehicle according to the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, the same reference numbers refer to the same or equivalent parts of the present disclosure throughout the several figures of the drawing.

DETAILED DESCRIPTION

Hereinafter, reference is now made in detail to various embodiments of the present disclosure, examples of which are illustrated in the accompanying drawings and described below. While the disclosure is described in conjunction with certain embodiments, it should be understood that present description is not intended to limit the disclosure to those embodiments. On the contrary, the disclosure is intended to cover not only the disclosed embodiments, but also various alternatives, modifications, equivalents, and other embodiments, which may be included within the spirit and scope of the disclosure as defined by the appended claims.

In the entire description, it will be understood that when a part is referred to as being "comprising" any components, it can further include other components rather than excluding unless otherwise specified.

Hereinafter, an embodiment of the present disclosure is described with reference to the accompanying drawings.

Figure 4:
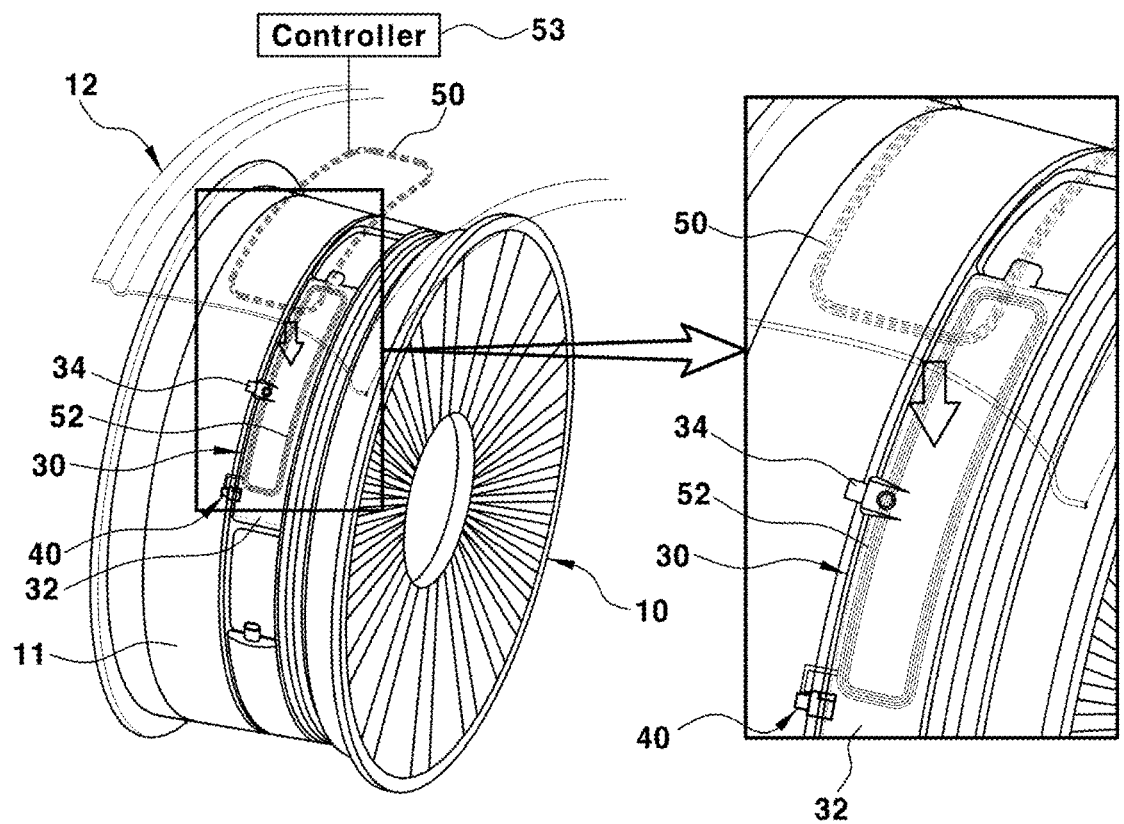
FIG. 4 is a perspective view illustrating a variable wheel resonator system for a vehicle according to the present disclosure.
Figure 5:
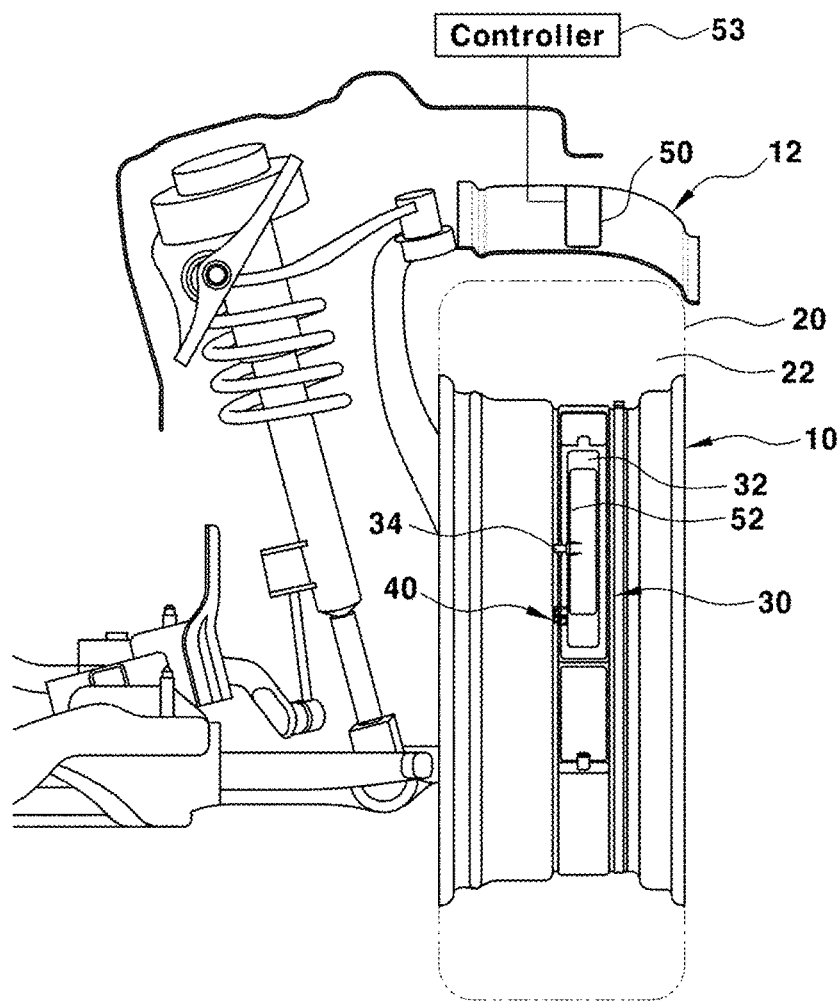
FIG. 5 is a front view illustrating a variable wheel resonator system for a vehicle according to the present disclosure.

FIG. 3 is a plan view illustrating a resonator of a variable wheel resonator system for a vehicle according to the present disclosure. FIGS. 4 and 5 are views illustrating a variable wheel resonator system for a vehicle according to the present disclosure.

As illustrated in FIG. 5, a tire 20 is mounted on a rim portion 11 of a vehicle wheel 10. An internal space of the tire 20 forms a first airtight air chamber 22.

As illustrated in FIGS. 4 and 5, a resonator 30 is mounted on an outer diameter portion of the rim portion 11 of the wheel 10.

As illustrated in FIG. 3, the resonator 30 is structured to have a second air chamber 32 formed therein with a specific volume and an air vent 34 formed on one side portion thereof to discharge an air in the second air chamber 32 to the first air chamber 22 inside the tire. The resonator 30 is mounted on the outer diameter portion of the rim portion 11 of the wheel 10.

In one example, a plurality of resonators 30 may be mounted at equal intervals along the circumference of the rim portion 11 of the wheel 10.

On a specific position of the resonator 30, a solenoid valve 40 is mounted to adjust an amount of air flowing from the first air chamber 22 to the second air chamber 32.

Further, a wireless power transmission and reception system is used as a power supply configured to provide power for turn-on operation of the solenoid valve 40.

In other words, when the wheel 10 is rotated during driving, the resonator 30 mounted with the solenoid valve 40 is also rotated, which makes it impossible to supply power by a wired circuit. Therefore, the power for the turn-on operation is supplied to the solenoid valve 40 by using the wireless power transmission and reception system.

For this, the wireless power transmission and reception system is configured to include a transmission-side coil 50 mounted on a wheel guard 12. The wireless power transmission and reception system is configured to be supplied with power from an external powersource (e.g., a vehicle battery) and to supply wireless power to a reception-side coil 52. The reception-side coil 52 is mounted on a surface of the resonator 30 and configured to receive the wireless power from the transmission-side coil 50 and to supply the received wireless power to the solenoid valve 40.

Of course, the transmission-side coil 50 of the wireless power transmission and reception system may be connected to a rectifier configured to convert AC current being supplied from the external power source into DC current, and may be connected to a regulator configured to stabilize the converted DC current.

In one example, a controller is composed of one module and may be connected to the transmission-side coil 50 of the wireless power transmission and reception system, which is the power supply to apply the current to the transmission-side coil 50 to suit a power supply time for turning on/off the solenoid valve 40 and a periodic signal.

Accordingly, the controller 53 configures an on/off period of the solenoid valve as one piece of data based on vehicle information. Such vehicle information may be a road-surface input frequency change, a driving speed and turning condition change, and a temperature change of an internal air of the tire. The controller 53 applies a power supply applied from the external power source to the transmission-side coil 50 based on the configured data to suit the power supply time for turning on/off the solenoid valve and the periodic signal.

If the current is applied to the transmission-side coil 50 to suit the power supply time for turning on/off the solenoid valve and the periodic signal, and an electromagnetic field is generated on the transmission-side coil 50, an induced current is created on the reception-side coil 52 by the electromagnetic field.

In one example, the solenoid valve 40 includes a built-in power circuit 43 conductively connected to the reception-side coil 52 and configured to convert an AC current into a DC current. The power circuit 43 may be configured to include a rectifier configured to convert the induced current created in the reception-side coil 52 into the DC current, and to include a regulator configured to stabilize a voltage of the converted DC current.

Figure 7:
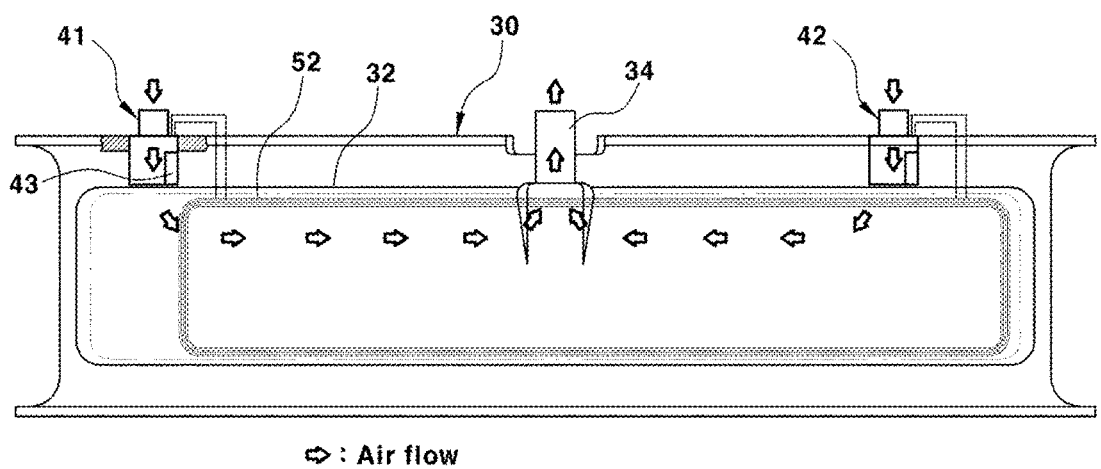
FIG. 7 is a schematic diagram illustrating another embodiment of a variable wheel resonator system for a vehicle according to the present disclosure.

As illustrated in FIG. 7, the solenoid valve 40 may be configured to include a first solenoid valve 41 and a second solenoid valve 42 mounted on both-side symmetric positions around the air vent 34 of the resonator 30.

An operation flow of the variable wheel resonator system as configured above according to the present disclosure is described.

The resonance frequency band in the internal space of the tire may differ in accordance with the vehicle information, such as the road-surface input frequency change (road-surface impact change) input to the tire, the driving speed and turning condition change, and the temperature change of the internal air of the tire.

Accordingly, the controller 53 configures the on/off period of the solenoid valve as one piece of data based on the vehicle information, such as the road-surface input frequency change, the driving speed and turning condition change, and the temperature change of an internal air of the tire. The controller 53 applies the power supply applied from the external power source to the transmission-side coil 50 based on the configured data to suit the power supply time for turning on/off the solenoid valve and the periodic signal.

If the current is applied to the transmission-side coil 50 to suit the power supply time for turning on/off the solenoid valve and the periodic signal, and the electromagnetic field is generated on the transmission-side coil 50, the induced current is created on the reception-side coil 52 by the electromagnetic field.

Accordingly, if the induced current is created on the reception-side coil 52, the current applied to the solenoid valve 40 is periodically repeated by the power circuit 43 conductively connected to the reception-side coil 52 to cause the on/off operation of the solenoid valve 40 to be repeated.

Figure 6:
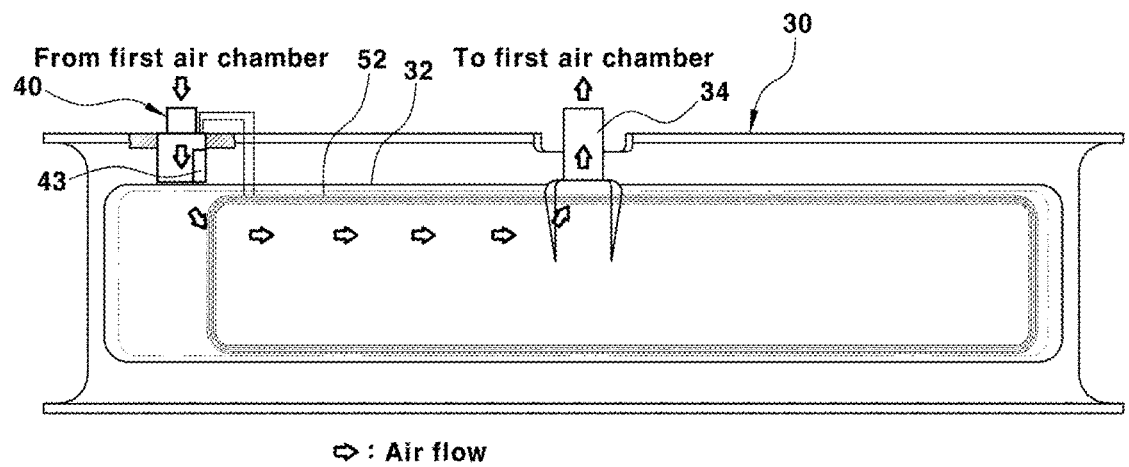
FIG. 6 is a schematic diagram illustrating an air flow control process of a variable wheel resonator system for a vehicle according to the present disclosure.

In this case, during the turn-on operation (opening) of the solenoid valve 40, as illustrated in FIG. 6, the air in the first air chamber 22 of the tire enters into the second air chamber 32 of the resonator 30 through the solenoid valve 40. Then the air flows into the first air chamber 22 through the air vent 34 of the resonator 30.

Accordingly, in accordance with the repetition period of the on/off operation of the solenoid valve 40, it is possible to control the amount of air flow that enters from the first air chamber 22 into the second air chamber 32 through the solenoid valve 40, and then that flows into the first air chamber 22 through the air vent 34.

As described above, through the on/off control of the solenoid valve 40 mounted on the wheel resonator 30, it is possible to suppress the resonance noise in the wide resonance frequency band that differs in accordance with the road-surface input frequency change (road-surface impact change) occurring during the vehicle driving, the driving speed and turning condition change, and the temperature change of the internal air of the tire by variably controlling the amount of the air flowing from the first air chamber 22 of the tire to the second air chamber 32 and then flowing again to the first air chamber 22.

In other words, if the resonance frequency being varied in accordance with the vibration that differs according to various driving situations during the vehicle driving enters from the first air chamber 22 to the second air chamber 32 through the solenoid valve 40 in accordance with the on/off operation of the solenoid valve 40, the air in the second air chamber 32 acts like a spring to convert the corresponding resonance frequency into a vibration frequency in the form of a new reverse phase. At the same time, the converted vibration frequency, in the form of the reverse phase, flows into the second air chamber 32 that is the internal space of the tire 20 through the air vent 34. Accordingly, a phase shift occurs with respect to the corresponding resonance frequency to cause the corresponding resonance frequency in the tire to become extinct or nullified. Thus, the resonance noise in the tire can be reduced.

On the other hand, the solenoid valve 40, as illustrated in FIG. 7, may be configured to include the first solenoid valve 41 and the second solenoid valve 42 mounted on both-side symmetric positions around the air vent 34 of the resonator 30. Accordingly, it is possible to more smoothly vary the amount of air flowing from the first air chamber 22 of the tire to the second air chamber 32 of the resonator 30 and then flowing again to the first air chamber 22 through the on/off control of the first and second solenoid valves 41 and 42, and to suppress the resonance noise of a wider resonance frequency band.

Aspects of the disclosure has been described in detail with reference to embodiments thereof. However, it will be appreciated by those having ordinary skill in the art that changes may be made in these embodiments without departing from the principles and spirit of the disclosure, the scope of which is defined in the appended claims and their equivalents.

What is claimed is:

1. A variable wheel resonator system for a vehicle, the system comprising:

a resonator structured to have a second air chamber formed therein and an air vent formed on one side portion thereof for communication with a first air chamber within a tire, the resonator being mounted on a rim portion of a wheel;

a solenoid valve mounted on a specific position of the resonator and configured to adjust an amount of air flowing from the first air chamber to the second air chamber;

a power supply configured to provide power for a turn-on operation of the solenoid valve; and a controller configured to control current being applied from an external power source to the power supply to suit a power supply time for turning on/off the solenoid valve and a periodic signal, wherein the specific position of the resonator is located in a first position that is different from a second position of the air vent such that air in the first air chamber of the tire enters into the second air chamber of the resonator through the solenoid valve and then flows into the first air chamber through the air vent of the resonator.

2. The system of claim 1, wherein a wireless power transmission and reception system is adopted as the power supply.

3. The system of claim 2, wherein the wireless power transmission and reception system comprises:
  a transmission-side coil mounted on a wheel guard and configured to be supplied with power from the external power source and to supply wireless power; and
  a reception-side coil mounted on a surface of the resonator and configured to receive the wireless power from the transmission-side coil and to supply the received wireless power to the solenoid valve.

4. The system of claim 3, wherein one controller is composed of one module on the transmission-side coil to apply the current to the transmission-side coil to suit the power supply time for turning on/off the solenoid valve and the periodic signal.

5. The system of claim 4, wherein the controller repeats the on/off operation of the solenoid valve by applying the current to the transmission-side coil to suit the power supply time for turning on/off the solenoid valve and the periodic signal based on the vehicle information.

6. The system of claim 3, wherein the solenoid valve comprises a built-in power circuit conductively connected to the reception-side coil and configured to convert an alternating current (AC) into a direct current (DC).

7. The system of claim 5, wherein, during the turn-on operation of the solenoid valve, the air in the first air chamber of the tire enters into the second air chamber of the resonator through the solenoid valve, and then flows into the first air chamber through the air vent of the resonator.

8. The system of claim 5, wherein in accordance with a repetition period of the on/off operation of the solenoid valve, an amount of air flow entering from the first air chamber into the second air chamber through the solenoid valve and then flowing into the first air chamber through the air vent is controlled.

9. The system of claim 1, wherein the valve is mounted on both-side symmetric positions around the air vent of the resonator.

* * * * *